(12) United States Patent
Vorbach

(10) Patent No.: US 9,043,769 B2
(45) Date of Patent: May 26, 2015

(54) OPTIMIZATION OF LOOPS AND DATA FLOW SECTIONS IN MULTI-CORE PROCESSOR ENVIRONMENT

(75) Inventor: Martin Vorbach, Lingenfeld (DE)

(73) Assignee: Hyperion Core Inc., Los Gatos, CA (US)

( * ) Notice: Subject to any disclaimer, the term of this patent is extended or adjusted under 35 U.S.C. 154(b) by 138 days.

(21) Appl. No.: 13/519,887

(22) PCT Filed: Dec. 28, 2010

(86) PCT No.: PCT/EP2010/007950
§ 371 (c)(1),
(2), (4) Date: Nov. 6, 2012

(87) PCT Pub. No.: WO2011/079942
PCT Pub. Date: Jul. 7, 2011

(65) Prior Publication Data
US 2013/0191817 A1    Jul. 25, 2013

(30) Foreign Application Priority Data

Dec. 28, 2009 (EP) .................................... 09016045
Jan. 15, 2010 (EP) .................................... 10000349
Mar. 2, 2010 (EP) .................................... 10002086
Jul. 9, 2010 (EP) .................................... 10007074
Dec. 28, 2010 (WO) ................. PCT/EP2010/007950

(51) Int. Cl.
*G06F 9/45* (2006.01)

(52) U.S. Cl.
CPC ................ *G06F 8/41* (2013.01); *G06F 8/4441* (2013.01); *G06F 8/452* (2013.01)

(58) Field of Classification Search
USPC .................. 717/140–144, 148–151, 154–156
IPC .............. G06F 8/41,8/443, 8/445, 8/452, 8/456, G06F 15/8053, 8/45
See application file for complete search history.

(56) References Cited

U.S. PATENT DOCUMENTS 5,770,894 A * 6/1998 Agarwal ........................ 717/149
6,438,747 B1 * 8/2002 Schreiber et al. .............. 717/160
6,964,029 B2 * 11/2005 Poznanovic et al. .......... 716/105
7,155,708 B2 * 12/2006 Hammes et al. ............... 717/155
7,260,817 B2 * 8/2007 Kawahito et al. .............. 717/155

(Continued)

FOREIGN PATENT DOCUMENTS

GB        2 398 412 A     8/2004
WO       2010/043401       4/2010

(Continued)

OTHER PUBLICATIONS

Xu et al, "Reduction Operations in Parallel Loops for GPGPUs", ACM, pp. 1-11, 2014.*

(Continued)

*Primary Examiner* — Anil Khatri
(74) *Attorney, Agent, or Firm* — IP Spring

(57) ABSTRACT

The present invention relates to a method for compiling code for a multi-core processor, comprising: detecting and optimizing a loop, partitioning the loop into partitions executable and mappable on physical hardware with optimal instruction level parallelism, optimizing the loop iterations and/or loop counter for ideal mapping on hardware, chaining the loop partitions generating a list representing the execution sequence of the partitions.

7 Claims, 10 Drawing Sheets

(56) References Cited

U.S. PATENT DOCUMENTS

| | | | |
|---|---|---|---|
| 7,299,458 B2* | 11/2007 | Hammes | 717/133 |
| 7,620,943 B1* | 11/2009 | Garthwaite | 717/140 |
| 7,725,848 B2* | 5/2010 | Nebel et al. | 716/136 |
| 7,814,469 B2* | 10/2010 | Wang et al. | 717/161 |
| 7,926,046 B2* | 4/2011 | Halambi et al. | 717/151 |
| 7,996,827 B2* | 8/2011 | Vorbach et al. | 717/149 |
| 8,091,078 B2* | 1/2012 | Brokenshire et al. | 717/143 |
| 8,108,844 B2* | 1/2012 | Crutchfield et al. | 717/149 |
| 8,122,442 B2* | 2/2012 | Lin | 717/159 |
| 8,136,104 B2* | 3/2012 | Papakipos et al. | 717/146 |
| 8,239,846 B2* | 8/2012 | Luszczek et al. | 717/149 |
| 8,429,636 B2* | 4/2013 | Chou et al. | 717/158 |
| 8,495,604 B2* | 7/2013 | Bellows et al. | 717/149 |
| 8,572,590 B2* | 10/2013 | Lethin et al. | 717/143 |
| 8,631,219 B2* | 1/2014 | Thomas et al. | 711/166 |
| 8,726,251 B2* | 5/2014 | Kalogeropulos et al. | 717/150 |
| 2009/0288075 A1 | 11/2009 | Song et al. | |
| 2010/0251229 A1 | 9/2010 | Fernandes et al. | |

FOREIGN PATENT DOCUMENTS

| | | |
|---|---|---|
| WO | 2010/142432 | 12/2010 |
| WO | 2011/079942 | 7/2011 |

OTHER PUBLICATIONS

He et al, "MPI and OpenMP Paradigms on Cluster of SMP Architectures: the Vacancy Tracking Algorithm for Multi-Dimensional Array Transposition", IEEE, pp. 1-14, 2002.*

Liu et al, "ArrayTool: A Lightweight Profiler to Guide Array Regrouping", ACM, pp. 405-415, 2014.*

Karmani et al, "Thread Contracts for Safe Parallelism", ACM, pp. 125-134, 2011.*

Trace Cache: a Low Latency Approach to High Bandwidth Instruction Fetching; Rotenberg, Bennett, Smith; IEEE; Proceedings of the 29thAnnual International Symposium on Microarchitecture, Dec. 2-4, 1996, Paris.

Shanley, Tom, "x86 Instruction Set Architecture", Mindshare Inc.; ISBN978-0-9770878-5-3, 2010.

Shanley, Tom, "Pentium Pro and Pentium II System Architecture; Second Edition", Mindshare Inc.; ISBN0-321-25656-X, 1998.

Shanley, Tom, "The Unabridged Pentium 4; IA32 Processor Genealogy", Mindshare Inc.; ISBN0-321-25656-X, 2004.

Aho, Alfred V, et al., "Compilers Principles, Techniques, & Tools; Second Edition", ISBN 0-321-48681-1, 2006.

* cited by examiner

Figure 2:
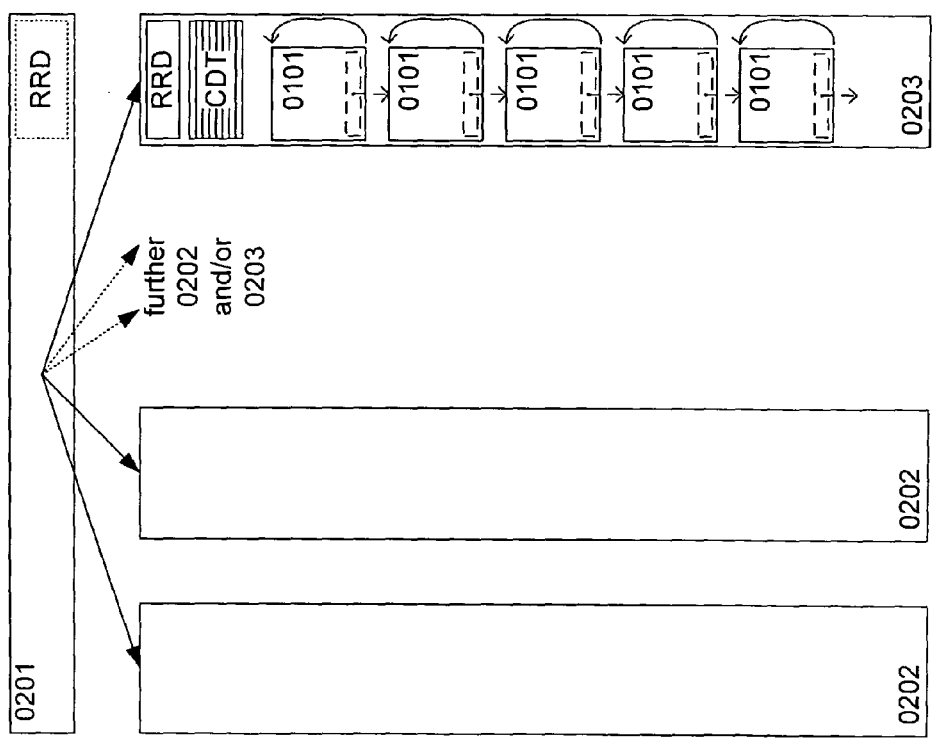

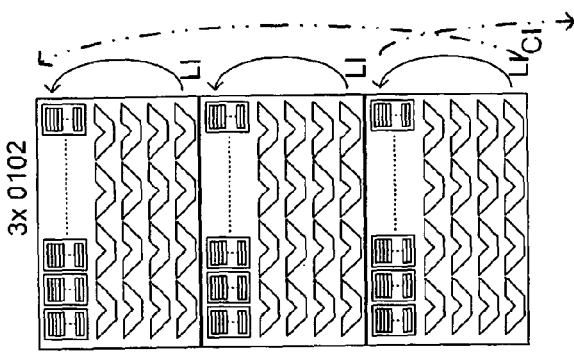
Fig. 1b2
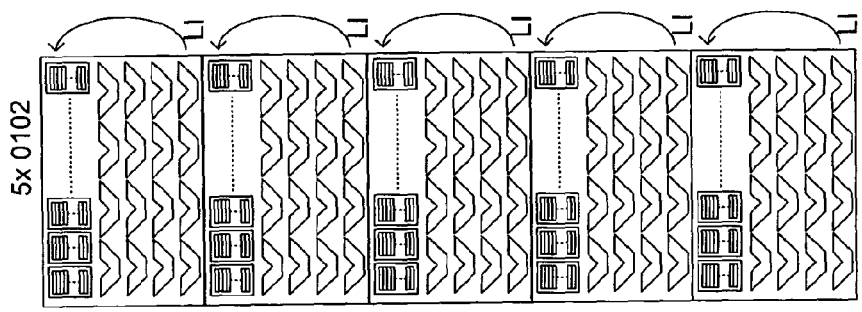
Fig. 1b1
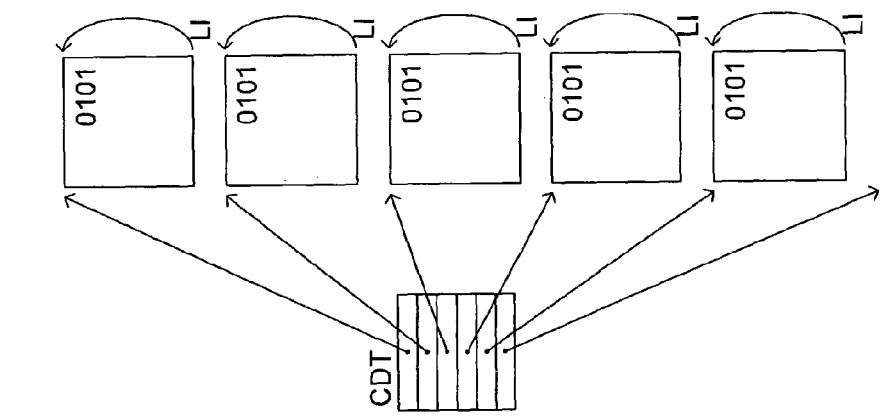
Fig. 1b
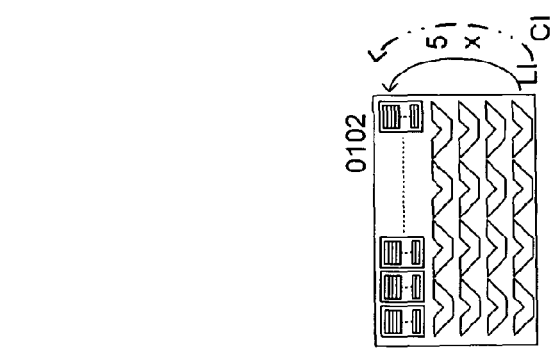
Fig. 1a1
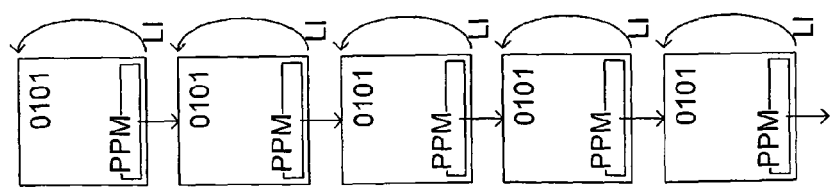
Fig. 1a

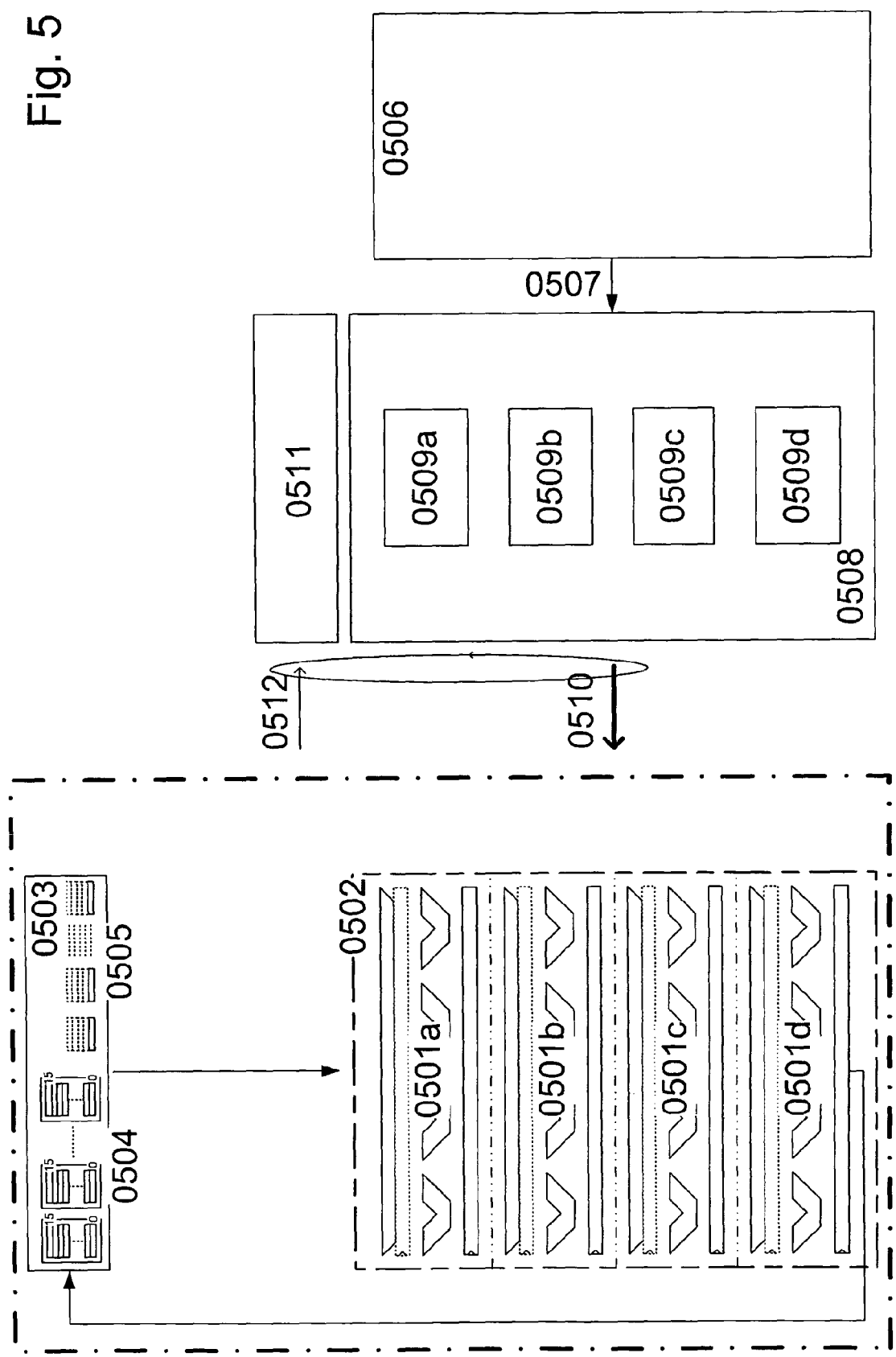

Fig. 7

Independent Mode

| | Stage 0 (i=0) | | | | | | | | | | | | | | | | Stage 1 (i=1) | | | | | | | | | | | | | | | | Stage 2 (i=2) | | | | | | | | | | | | | | | | Stage 3 (i=3) | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| r<sub>i</sub>00 | r<sub>i</sub>01 | r<sub>i</sub>02 | r<sub>i</sub>03 | r<sub>i</sub>04 | r<sub>i</sub>05 | r<sub>i</sub>06 | r<sub>i</sub>07 | r<sub>i</sub>08 | r<sub>i</sub>09 | r<sub>i</sub>10 | r<sub>i</sub>11 | r<sub>i</sub>12 | r<sub>i</sub>13 | r<sub>i</sub>14 | r<sub>i</sub>15 | | | | | | | | | | | | | | | | | | | | | | | | | | | | | | | | | | | | | | | | | | | | | | | | |
| e00 | e01 | e02 | e03 | e04 | e05 | e06 | e07 | e08 | e09 | e10 | e11 | e12 | e13 | e14 | e15 | e00 | e01 | e02 | e03 | e04 | e05 | e06 | e07 | e08 | e09 | e10 | e11 | e12 | e13 | e14 | e15 | e00 | e01 | e02 | e03 | e04 | e05 | e06 | e07 | e08 | e09 | e10 | e11 | e12 | e13 | e14 | e15 | e00 | e01 | e02 | e03 | e04 | e05 | e06 | e07 | e08 | e09 | e10 | e11 | e12 | e13 | e14 | e15 |
| e16 | e17 | e18 | e19 | e20 | e21 | e22 | e23 | e24 | e25 | e26 | e27 | e28 | e29 | e30 | e31 | e16 | e17 | e18 | e19 | e20 | e21 | e22 | e23 | e24 | e25 | e26 | e27 | e28 | e29 | e30 | e31 | e16 | e17 | e18 | e19 | e20 | e21 | e22 | e23 | e24 | e25 | e26 | e27 | e28 | e29 | e30 | e31 | e16 | e17 | e18 | e19 | e20 | e21 | e22 | e23 | e24 | e25 | e26 | e27 | e28 | e29 | e30 | e31 |
| e32 | e33 | e34 | e35 | e36 | e37 | e38 | e39 | e40 | e41 | e42 | e43 | e44 | e45 | e46 | e47 | e32 | e33 | e34 | e35 | e36 | e37 | e38 | e39 | e40 | e41 | e42 | e43 | e44 | e45 | e46 | e47 | e32 | e33 | e34 | e35 | e36 | e37 | e38 | e39 | e40 | e41 | e42 | e43 | e44 | e45 | e46 | e47 | e32 | e33 | e34 | e35 | e36 | e37 | e38 | e39 | e40 | e41 | e42 | e43 | e44 | e45 | e46 | e47 |
| e48 | e49 | e50 | e51 | e52 | e53 | e54 | e55 | e56 | e57 | e58 | e59 | e60 | e61 | e62 | e63 | e48 | e49 | e50 | e51 | e52 | e53 | e54 | e55 | e56 | e57 | e58 | e59 | e60 | e61 | e62 | e63 | e48 | e49 | e50 | e51 | e52 | e53 | e54 | e55 | e56 | e57 | e58 | e59 | e60 | e61 | e62 | e63 | e48 | e49 | e50 | e51 | e52 | e53 | e54 | e55 | e56 | e57 | e58 | e59 | e60 | e61 | e62 | e63 |

Joint Mode, VLIW Mode and ULIW Mode

| e00 | e01 | e02 | e03 | e04 | e05 | e06 | e07 | e08 | e09 | e10 | e11 | e12 | e13 | e14 | e15 |
|---|---|---|---|---|---|---|---|---|---|---|---|---|---|---|---|
| e16 | e17 | e18 | e19 | e20 | e21 | e22 | e23 | e24 | e25 | e26 | e27 | e28 | e29 | e30 | e31 |
| e32 | e33 | e34 | e35 | e36 | e37 | e38 | e39 | e40 | e41 | e42 | e43 | e44 | e45 | e46 | e47 |
| e48 | e49 | e50 | e51 | e52 | e53 | e54 | e55 | e56 | e57 | e58 | e59 | e60 | e61 | e62 | e63 |

Fig. 8a

Independent Mode

Stage 0:

| e/$r_0$00 | e/$r_0$01 | e/$r_0$02 | e/$r_0$03 | $r_0$04 | $r_0$05 | $r_0$06 | $r_0$07 | $r_0$08 | $r_0$09 | $r_0$10 | $r_0$11 | $r_0$12 | $r_0$13 | $r_0$14 | $r_0$15 |
| --- | --- | --- | --- | --- | --- | --- | --- | --- | --- | --- | --- | --- | --- | --- | --- |
| | | | | e04 | e05 | e06 | e07 | e08 | e09 | e10 | e11 | e12 | e13 | e14 | e15 |

Stage 1:

| $r_1$00 | $r_1$01 | $r_1$02 | $r_1$03 | | | | | $r_1$08 | $r_1$09 | $r_1$10 | $r_1$11 | $r_1$12 | $r_1$13 | $r_1$14 | $r_1$15 |
| --- | --- | --- | --- | --- | --- | --- | --- | --- | --- | --- | --- | --- | --- | --- | --- |
| e00 | e01 | e02 | e03 | e/$r_1$04 | e/$r_1$05 | e/$r_1$06 | e/$r_1$07 | e08 | e09 | e10 | e11 | e12 | e13 | e14 | e15 |

Stage 2:

| $r_2$00 | $r_2$01 | $r_2$02 | $r_2$03 | $r_2$04 | $r_2$05 | $r_2$06 | $r_2$07 | | | | | $r_2$12 | $r_2$13 | $r_2$14 | $r_2$15 |
| --- | --- | --- | --- | --- | --- | --- | --- | --- | --- | --- | --- | --- | --- | --- | --- |
| e00 | e01 | e02 | e03 | e04 | e05 | e06 | e07 | e/$r_2$08 | e/$r_2$09 | e/$r_2$10 | e/$r_2$11 | e12 | e13 | e14 | e15 |

Stage 3:

| $r_3$00 | $r_3$01 | $r_3$02 | $r_3$03 | $r_3$04 | $r_3$05 | $r_3$06 | $r_3$07 | $r_3$08 | $r_3$09 | $r_3$10 | $r_3$11 | | | | |
| --- | --- | --- | --- | --- | --- | --- | --- | --- | --- | --- | --- | --- | --- | --- | --- |
| e00 | e01 | e02 | e03 | e04 | e05 | e06 | e07 | e08 | e09 | e10 | e11 | e/$r_3$12 | e/$r_3$13 | e/$r_3$14 | e/$r_3$15 |

Joint Mode, VLIW Mode and ULIW Mode

| $r_0$00 | $r_0$01 | $r_0$02 | $r_0$03 | $r_0$04 | $r_0$05 | $r_0$06 | $r_0$07 | $r_0$08 | $r_0$09 | $r_0$10 | $r_0$11 | $r_0$12 | $r_0$13 | $r_0$14 | $r_0$15 |
| --- | --- | --- | --- | --- | --- | --- | --- | --- | --- | --- | --- | --- | --- | --- | --- |
| $r_1$00 | $r_1$01 | $r_1$02 | $r_1$03 | $r_1$04 | $r_1$05 | $r_1$06 | $r_1$07 | $r_1$08 | $r_1$09 | $r_1$10 | $r_1$11 | $r_1$12 | $r_1$13 | $r_1$14 | $r_1$15 |
| $r_2$00 | $r_2$01 | $r_2$02 | $r_2$03 | $r_2$04 | $r_2$05 | $r_2$06 | $r_2$07 | $r_2$08 | $r_2$09 | $r_2$10 | $r_2$11 | $r_2$12 | $r_2$13 | $r_2$14 | $r_2$15 |
| $r_3$00 | $r_3$01 | $r_3$02 | $r_3$03 | $r_3$04 | $r_3$05 | $r_3$06 | $r_3$07 | $r_3$08 | $r_3$09 | $r_3$10 | $r_3$11 | $r_3$12 | $r_3$13 | $r_3$14 | $r_3$15 |
| e/$r_0$00 | e/$r_0$01 | e/$r_0$02 | e/$r_0$03 | e/$r_1$04 | e/$r_1$05 | e/$r_1$06 | e/$r_1$07 | e/$r_2$08 | e/$r_2$09 | e/$r_2$10 | e/$r_2$11 | e/$r_3$12 | e/$r_3$13 | e/$r_3$14 | e/$r_3$15 |

Fig. 8b

Independent Mode

Stage 0:

| e00/ | e01/ | e02/ | e03/ |
|---|---|---|---|
| $r_000$ | $r_001$ | $r_002$ | $r_003$ |

| $r_004$ | $r_005$ | $r_006$ | $r_007$ | $r_008$ | $r_009$ | $r_010$ | $r_011$ | $r_012$ | $r_013$ | $r_014$ | $r_015$ |

Stage 1:

| e04/ | e05/ | ee06/ | e07/ |
|---|---|---|---|
| $r_100$ | $r_101$ | $r_102$ | $r_103$ |

| $r_104$ | $r_105$ | $r_106$ | $r_107$ | $r_108$ | $r_109$ | $r_110$ | $r_111$ | $r_112$ | $r_113$ | $r_114$ | $r_115$ |

Stage 2:

| e08/ | e09/ | e10/ | e11/ |
|---|---|---|---|
| $r_200$ | $r_201$ | $r_202$ | $r_203$ |

| $r_204$ | $r_205$ | $r_206$ | $r_207$ | $r_208$ | $r_209$ | $r_210$ | $r_211$ | $r_212$ | $r_213$ | $r_214$ | $r_215$ |

Stage 3:

| e12/ | e13/ | e14/ | e15/ |
|---|---|---|---|
| $r_300$ | $r_301$ | $r_302$ | $r_303$ |

| $r_304$ | $r_305$ | $r_306$ | $r_307$ | $r_308$ | $r_309$ | $r_310$ | $r_311$ | $r_312$ | $r_313$ | $r_314$ | $r_315$ |

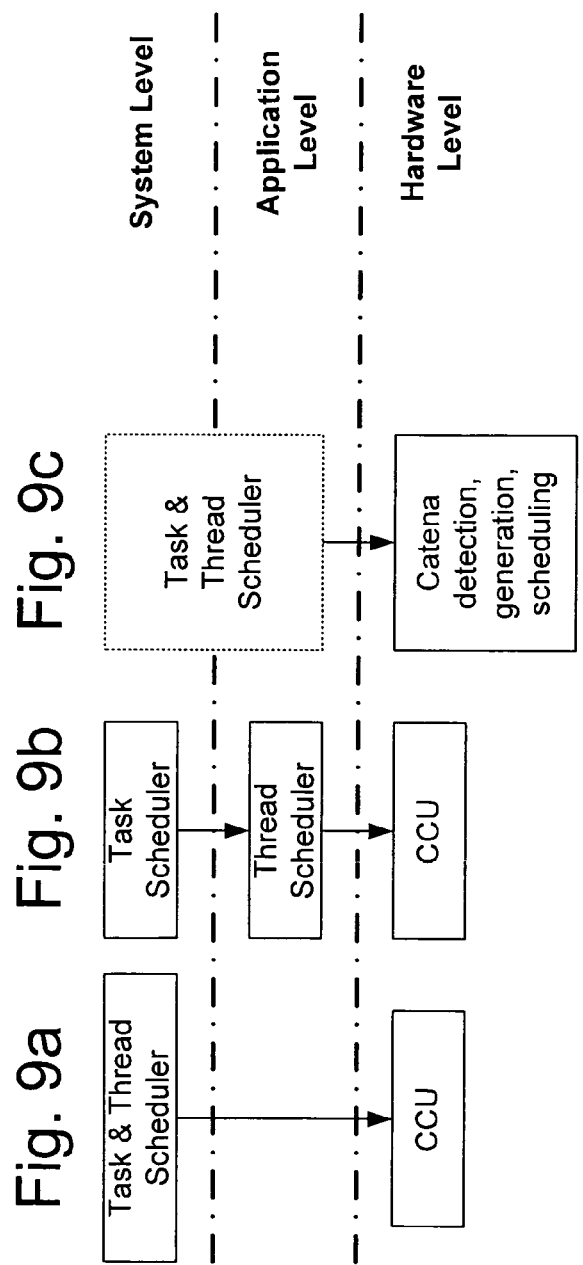

OPTIMIZATION OF LOOPS AND DATA FLOW SECTIONS IN MULTI-CORE PROCESSOR ENVIRONMENT

INTRODUCTION AND FIELD OF INVENTION

The present invention relates to data processing in general and to data processing architecture in particular.

Energy efficient, high speed data processing is desirable for any processing device. This holds for all devices wherein data are processed such as cell phones, cameras, hand held computers, laptops, workstations, servers and so forth, offering different processing performance based on accordingly adapted architectures.

Often similar applications need to be executed on different devices and/or processor platforms. Since coding software is expensive, it is be desirable to have software code which can be compiled without major changes for a large number of different platforms offering different processing performance.

It would be desirable to provide a data processing architecture that can be easily adapted to different processing performance requirements while necessitating only minor adoptions to coded software It is an object of the present invention to provide an improvement over the prior art of processing architectures with respect to at least one of data processing efficiency, power consumption and reuse of the software codes.

The present invention describes a new processor architecture called ZZYX thereafter, overcoming the limitations of both, sequential processors and dataflow architectures, such as reconfigurable computing.

It shall be noted that whereas hereinafter, frequently terms such as "each" or "every" and the like are used when certain preferred properties of elements of the architecture and so forth are described. This is done so in view of the fact that generally, it will be highly preferred to have certain advantageous properties for each and every element of a group of similar elements. It will be obvious to the average skilled person however, that some if not all of the advantages of the present invention disclosed hereinafter might be obtainable, even if only to a lesser degree, if only some but not all similar elements of a group do have a particular property. Thus, the use of certain words such as "each", "any" "every" and so forth. is intended to disclose the preferred mode of invention and whereas it is considered feasible to limit any claim to only such preferred embodiments, it will be obvious that such limitations are not meant to restrict the scope of the disclosure to only the embodiments preferred.

It shall also be noted that notwithstanding the fact that a completely new architecture is disclosed hereinafter, several aspects of the disclosure are considered inventive per se, even in cases where other advantageous aspects described hereinafter are not realized.

The technology described in this patent is particularly applicable on ZZYX processors as described in PCT/EP 2009/007415 and/or their memory architectures as described in PCT/EP 2010/003459, which are also applicable on multi-core processors are known in the state of the art (e.g. from INTEL, AMD, MIPS and ARM). Both patents are fully embedded into this specification by reference for detailed disclosure.

The ZZYX processor comprises multiple ALU-Blocks in an array with pipeline stages between each row of ALU-Blocks. Each ALU-BLOCK may comprise further internal pipeline stages. In contrast to reconfigurable processors data flows preferably in one direction only, in the following exemplary embodiments from top to bottom. Each ALU may execute a different instruction on a different set of data, whereas the structure may be understood as a MIMD (Multiple Instruction, Multiple Data) machine.

The ZZYX processor is optimized for loop execution. In contrast to traditional processors, instructions once issued to the ALUs may stay the same for a plurality of clock cycles, while multiple data words are streamed through the ALUs. Each of the multiple data words is processed based on the same temporarily fixed instructions. After a plurality of clock cycles, e.g. when the loop has terminated, the operation continues with one or a set of newly fetched, decoded and issued instruction(s).

The ZZYX processor's ALU Block can also implement a novel approach to out-of-order processing being more efficient than those in the state of the art. Reference is made to DE 10 013 932.8 and the respective patent family, which is fully embedded into this specification by reference for detailed disclosure.

The ZZYX processor provides sequential VLIW-like processing combined with superior dataflow and data stream processing capabilities. The ZZYX processor cores are scalable in at least 3 ways:

1. The number of ALUs can be scaled at least two dimensionally according to the required processing performance; the term multi-dimensional is to refer to "more than one dimension". It should be noted that stacking several planes will lead to a three dimensional arrangement;
2. the amount of Load/Store units and/or Local Memory Blocks is scalable according to the data bandwidth required by the application;
3. the number of ZZYX cores per chip is scalable at least one dimensionally, preferably two or more dimensionally, according to the product and market. Low cost and low power mobile products (such as mobile phones, PDAs, cameras, camcorders and mobile games) may comprise only one or a very small amount of ZZYX cores, while high end consumer products (such as Home PCs, HD Settop Boxes, Home Servers, and gaming consoles) may have tens of ZZYX cores or more.

High end applications, such as HPC (high performance computing) systems, accelerators, servers, network infrastructure and high and graphics may comprise a very large number of interconnected ZZYX cores.

ZZYX processors may therefore represent one kind of multicore processor and/or chip multiprocessors (CMPs) architecture.

The major benefit of the ZZYX processor concept is the implicit software scalability. Software written for a specific ZZYX processor will run on single processor as well as on a multi-processor or multi-core processor arrangement without modification as will be obvious from the text following hereinafter. Thus, the software scales automatically according to the processor platform it is executed on.

The concepts of the ZZYX processor and the inventions described in this patent are applicable on traditional processors, multithreaded processors and/or multi-core processors. A traditional processor is understood as any kind of processor, which may be a microprocessor, such as an AMD PHENOM, INTEL PENTIUM, CORE2 or XEON, IBM's and SONY's CELL processor, ARM, TENSILICA or ARC; but also DSPs such as the C64 family from TI, 3DSP, STARCORE, or the BLACKFIN from ANALOG DEVICES.

The concepts disclosed are also applicable on reconfigurable processors, such as SILICONHIVE, IMEC's ADRES, the DRP from NEC, STRETCH, or IPFLEX; or multi-processors systems such as PICOCHIP or TILERA. Most of the concepts, especially the memory hierarchy, local memories elements, and Instruction Fetch units as well as the basic processor model can be used in FPGAs, either by configuring the according mechanisms into the FPGAs or by implementing according hardwired elements fixedly into the silicon chip. FPGAs are known as Field Programmable Gate Arrays, well known from various suppliers such as XILINX (e.g. the VIRTEX or SPARTAN families), ALTERA, or LATTICE.

The concepts disclosed are particularly well applicable on stream processors, graphics processors (GPU) as for example known from NVIDIA (e.g. GEFORCE, and especially the CUDA technology), ATI/AMD and INTEL (e.g. LARRABEE), and especially General Purpose Graphics Processors (GPGPU) also know from NVIDIA, ATI/AMD and INTEL.

ZZYX processors may operate stand alone, or integrated partially, or as a core into traditional processors or FPGAs; it is noted that any such FPGA integrating a ZZYX processor as disclosed hereinafter will be or have coarse granular elements. While ZZYX may operate as a co-processor or thread resource connected to a processor (which may be a microprocessor or DSP), it may be integrated into FPGAs as processing device. FPGAs may integrate just one ZZYX core or multiple ZZYX cores arranged in a horizontal or vertical strip or as a multi-dimensional matrix.

All described embodiments are exemplary and solely for the purpose of outlining the inventive apparatuses and/or methods. Different aspects of the invention can be implemented or combined in various ways and/or within or together with a variety of other apparatuses and/or methods.

A variety of embodiments is disclosed in this patent. However, it shall be noted, that the specific constellation of methods and features depends on the final implementation and the target specification. For example may a classic CISC processor require another set of features than a CISC processor with a RISC core, which again differs from a pure RISC processor, which differs from a VLIW processor. Certainly, a completely new processor architecture, not bound to any legacy, may have another constellation of the disclosed features. On that basis it shall be expressively noted, that the methods and features which may be exemplary combined for specific purposes may be mixed and claimed in various combinations for a specific target processor.

Thread Management

STATE OF THE ART

A thread is called a lightweight process. It is a flow of control within a process. It is a basic unit of CPU utilization. It comprises of a thread ID, a program counter, a register set and a stack. If the two threads belong to the same process, they share its code section, data section and other operating system resource. A traditional process has a single thread of control. If the process has multiple threads of control, it can do more than one task at a time.

A thread of execution results from a fork of a computer program into two or more concurrently running tasks. The implementation of threads and processes differs from one operating system to another, but in most cases, a thread is contained inside a process. Multiple threads can exist within the same process and share resources such as memory, while different processes do not share these resources.

On a single processor, multithreading generally occurs by time-division multiplexing (as in multitasking): the processor switches between different threads. This context switching generally happens frequently enough that the user perceives the threads or tasks as running at the same time. On a multi-processor or multi-core system, the threads or tasks will generally run at the same time-if sufficient hardware resources are available; each hardware resource (e.g. processor and/or core, e.g. ALU-Block) running a particular thread or task. Support for threads in programming languages varies. A number of languages support multiple threads but do not allow them to execute at the same time. Examples of such languages include Python (at least the C version, also known as CPython, but not IronPython or Jython), and OCaml, because the parallel support of their runtime environment is based on a central lock, called the "Global Interpreter Lock" in Python and the "master lock" in Ocaml. Other languages may be limited because they use threads that are user threads, which are not visible to the kernel, and thus cannot be scheduled to run concurrently. On the other hand, kernel threads, which are visible to the kernel, can run concurrently.

Many modern operating systems directly support both time-sliced and multiprocessor threading with a process scheduler. The kernel of an operating system allows programmers to manipulate threads via the system call interface. Some implementations are called a kernel thread, whereas a lightweight process (LWP) is a specific type of kernel thread that shares the same state and information.

Programs can have user-space threads when threading with timers, signals, or other methods to interrupt their own execution, performing a sort of ad-hoc time-slicing.

Threads Compared to Processes

Threads differ from traditional multitasking operating system processes in that:
- processes are typically independent, while threads exist as subsets of a process
- processes carry considerable state information, whereas multiple threads within a process share state as well as memory and other resources
- processes have separate address spaces, whereas threads share their address space
- processes interact only through system-provided interprocess communication mechanisms.
- Context switching between threads in the same process is typically faster than context switching between processes.

Systems like Windows NT and OS/2 are said to have "cheap" threads and "expensive" processes; in other operating systems there is not so great a difference except the cost of address space switch which implies a TLB flush.

Operating systems schedule threads in one of two ways:
1. Preemptive multithreading is generally considered the superior approach, as it allows the operating system to determine when a context switch should occur. The disadvantage to preemptive multithreading is that the system may make a context switch at an inappropriate time, causing priority inversion or other negative effects which may be avoided by cooperative multithreading.
2. Cooperative multithreading, on the other hand, relies on the threads themselves to relinquish control once they are at a stopping point. This can create problems if a thread is waiting for a resource to become available.

Traditional mainstream computing hardware did not have much support for multithreading as switching between threads was generally already quicker than full process context switches. Processors in embedded systems, which have higher requirements for real-time behaviors, might support multithreading by decreasing the thread-switch time, perhaps by allocating a dedicated register file for each thread instead of saving/restoring a common register file. In the late 1990s, the idea of executing instructions from multiple threads simultaneously has become known as simultaneous multithreading. This feature was introduced in INTEL's Pentium 4 processor, with the name hyper threading.

Processes, Kernel Threads, User Threads, and Fibers

A process is the "heaviest" unit of kernel scheduling. Processes own resources allocated by the operating system. Resources include memory, file handles, sockets, device handles, and windows. Processes do not share address spaces or file resources except through explicit methods such as inheriting file handles or shared memory segments, or mapping the same file in a shared way. Processes are typically preemptively multitasked.

A kernel thread is the "lightest" unit of kernel scheduling. At least one kernel thread exists within each process. If multiple kernel threads can exist within a process, then they share the same memory and file resources. Kernel threads are preemptively multitasked if the operating system's process scheduler is preemptive. Kernel threads do not own resources except for a stack, a copy of the registers including the program counter, and thread-local storage (if any).

Threads are sometimes implemented in user-space libraries, thus called user threads. The kernel is not aware of them, they are managed and scheduled in user-space. Some implementations base their user threads on top of several kernel threads to benefit from multi-processor machines (N:M model).

Fibers are an even lighter unit of scheduling which are cooperatively scheduled: a running fiber must explicitly "yield" to allow another fiber to run, which makes their implementation much easier than kernel or user threads. A fiber can be scheduled to run in any thread in the same process. This permits applications to gain performance improvements by managing scheduling themselves, instead of relying on the kernel scheduler (which may not be tuned for the application). Parallel programming environments such as OpenMP typically implement their tasks through fibers.

Concurrency and Data Structures

Threads in the same process share the same address space. This allows concurrently-running code to couple tightly and conveniently exchange data without the overhead or complexity of an IPC. When shared between threads, however, even simple data structures become prone to race hazards if they require more than one CPU instruction to update: two threads may end up attempting to update the data structure at the same time and find it unexpectedly changing underfoot. Bugs caused by race hazards can be very difficult to reproduce and isolate.

To prevent this, threading APIs offer synchronization primitives such as mutexes to lock data structures against concurrent access. On uniprocessor systems, a thread running into a locked mutex must sleep and hence trigger a context switch. On multi-processor systems, the thread may instead poll the mutex in a spinlock. Both of these may sap performance and force processors in SMP systems to contend for the memory bus, especially if the granularity of the locking is fine.

I/O and Scheduling

User thread or fiber implementations are typically entirely in user-space. As a result, context switching between user threads or fibers within the same process is extremely efficient because it does not require any interaction with the kernel at all: a context switch can be performed by locally saving the CPU registers used by the currently executing user thread or fiber and then loading the registers required by the user thread or fiber to be executed. Since scheduling occurs in user-space, the scheduling policy can be more easily tailored to the requirements of the program's workload.

The use of kernel threads simplifies user code by moving some of the most complex aspects of threading into the kernel. The program doesn't need to schedule threads or explicitly yield the processor. User code can be written in a familiar procedural style, including calls to blocking APIs, without starving other threads. However, kernel threading on uniprocessor systems may force a context switch between threads at any time, and thus expose race hazards and concurrency bugs that would otherwise lie latent. On SMP systems, this is further exacerbated because kernel threads may literally execute concurrently on separate processors.

Thread Models

1:1

1:1 threads created by the user are in 1-1 correspondence with schedulable entities in the kernel. This is the simplest possible threading implementation. On LINUX, the usual C library implements this approach (via the NPTL or older LINUXTHREADS). The same approach is used by SOLARIS, NETBSD and FREEBSD.

N:M

N:M maps some N number of application threads onto some M number of kernel entities, or "virtual processors". This is a compromise between kernel-level ("1:1") and user-level ("N:1") threading. In general, "N:M" threading systems are more complex to implement than either kernel or user threads, because both changes to kernel and user-space code are required. In the N:M implementation, the threading library is responsible for scheduling user threads on the available schedulable entities; this makes context switching of threads very fast, as it avoids system calls. However, this increases complexity and the likelihood of priority inversion, as well as suboptimal scheduling without extensive (and expensive) coordination between the user scheduler and the kernel scheduler.

N:1

An N:1 model implies that all application-level threads map on to a single kernel-level scheduled entity; the kernel has no knowledge of the application threads. With this approach, context switching can be done very fast and, in addition, it can be implemented even on simple kernels which do not support threading. One of the major drawbacks however is that it cannot benefit from the hardware acceleration on multithreaded processors or multi-processor computers: there is never more than one thread being scheduled at the same time. It is used by GNU Portable Threads.

NVIDIA supports in the CUDA architecture a special kind of thread called warps. To manage hundreds of threads running several different programs, the TESLA SM employs a new architecture called SIMT (single-instruction, multiple-thread). The SM maps each thread to one SP scalar core, and each scalar thread executes independently with its own instruction address and register state. The SM SIMT unit creates, manages, schedules, and executes threads in groups of 32 parallel threads called warps. Individual threads composing a SIMT warp start together at the same program address but are otherwise free to branch and execute independently. Each SM manages a pool of 24 warps of 32 threads per warp, a total of 768 threads.

Every instruction issue time, the SIMT unit selects a warp that is ready to execute and issues the next instruction to the active threads of the warp. A warp executes one common instruction at a time, so full efficiency is realized when all 32 threads of a warp agree on their execution path. If threads of a warp diverge via a data-dependent conditional branch, the warp serially executes each branch path taken, disabling threads that are not on that path, and when all paths complete, the threads converge back to the same execution path. Branch divergence occurs only within a warp; different warps execute independently regardless of whether they are executing common or disjointed code paths. As a result, the TESLA-architecture GPUs are dramatically more efficient and flexible on branching code than previous-generation GPUs, as their 32-thread warps are much narrower than the SIMD (single-instruction multiple-data) width of prior GPUs. SIMT architecture is akin to SIMD vector organizations in that a single instruction controls multiple processing elements. A key difference is that SIMD vector organizations expose the SIMD width to the software, whereas SIMT instructions specify the execution and branching behavior of a single thread. In contrast with SIMD vector machines, SIMT enables programmers to write thread-level parallel code for independent, scalar threads, as well as data-parallel code for coordinated threads. For the purposes of correctness, the programmer can essentially ignore the SIMT behavior; however, substantial performance improvements can be realized by taking care that the code seldom requires threads in a warp to diverge. In practice, this is analogous to the role of cache lines in traditional code: cache line size can be safely ignored when designing for correctness but must be considered in the code structure when designing for peak performance Vector architectures, on the other hand, require the software to coalesce loads into vectors and manage divergence manually.

Threads on ZZYX Processors

ZZYX processors, comprising a plurality of resources operating in parallel, benefit from advanced management of software threads.

Threads on ZZYX processors may be concurrently started and are executed virtually in parallel. Threads synchronize preferably autonomously using e.g. semaphores and/or mutexes.

A thread my comprise one or a plurality of microthreads, especially a thread may be a microthread.

Microthreads are small code fragments that can be run concurrently to gain increased performance in microprocessors. They provide an execution model that may use a few additional instructions in the instruction set architecture (ISA) of a conventional processor for breaking code down into fragments or indicating fragments that execute simultaneously. Dependencies may be managed by handshaking registers or data transfers in the microprocessor executing the code so that the executing is synchronized, one microthread will wait for another to produce data. For handshaking respective protocols may be used, status registers might be implemented or flags attached to registers indicating their state and/or the state of the data processing of a Catena. This is a form of dataflow. This model can be applied to an existing instruction set architecture incrementally by providing just a few (typically about 5 instructions are sufficient) new instructions to implement concurrency controls.

A set of microthreads is a static partition of a basic block into concurrently executing fragments, which may execute on a multicore processor (and/or CMP) and share a microcontext.

Microthreads are preferably managed by schedulers implemented in hardware (hardware schedulers).

Using the Microthread model, compilers may generate concurrency from sequential source code, which can be used to optimize a range of operational parameters such as power and performance over many orders of magnitude, given a scalable implementation. This provides scalability in performance, power and most importantly, in silicon implementation. The microthread model requires dynamic register allocation and a hardware scheduler, which must support hundreds of microthreads per processor. The scheduler should support thread creation, context switching and thread rescheduling on every machine cycle to fully support this model.

A microthread and/or a thread may be divided into a plurality of Catena (pl. Catenae). Typically each Catena is a block of code executed on a single ZZYX core, e.g. called Multi-Cycle-Kernels From one aspect the construction of a Catena—which defines the Catena—may be understood as detecting and optimizing a loop and/or dataflow section in the source code, partitioning the loop and/or dataflow section into partitions executable and mappable on physical hardware with the goal to achieve optimal instruction level parallelism (ideally a Catena fits directly onto the available hardware resources, similar to configuration of a configurable device without requiring sequential instruction fetching), optimizing the loop iterations and/or loop counter or loop control and/or outer control structure of the loop and/or dataflow section for ideal mapping onto the hardware and chaining together the loop and/or dataflow partitions.

Processors such as the ZZYX core, provide the ability to scale e.g. data flow code and/or inner loops at low hardware level, such as ALU units and/or ALU-Blocks.

A loop may be partitioned into Multi-Cycle-Kernels, each being mapped onto physical hardware at runtime. While one limited hardware resources (e.g. one ALU-Block) may be able to process one Multi-Cycle-Kernel at a time only, more resource intense hardware implementations (e.g. a plurality of ALU-Blocks) may be able to process a plurality of Multi-Cycle-Kernels concurrently in parallel.

The Catena concept provides the ability to optimally scale Multi-Cycle-Kernels, optimized into Catenae, without further influence or effort of the programmer on a variety of processor hardware platforms, from very limited to vast resources.

FIG. 1a for example shows the sequential execution of 5 Catenae (or non-optimized Multi-Cycle-Kernels) (0101) on a single ALU-Block (0102).

FIG. 1b for example shows the fully parallel (FIG. 1b2) or partial parallel (FIG. 1b2) execution of the 5 Catenae (0101) on a plurality of ALU-Blocks (0102) (5 in FIG. 1b1, 3 in FIG. 1b2).

Further details of FIGS. 1a and 1b will be described subsequently.

A Catena may look like the following code example:

| add -, r0, r1 | sub r2, r3, r1 | sr r6, 1 | nop |
|---|---|---|---|
| mul -, a00, a02 | nop | st r7, r4 | ld r3,r14 |
| sub r2, a10, a01 | mov r5, r10 | add r11, r12, r15 | and -, r11, r12 |
| or r14, a20, a22 cycle | sl r13, a22 | nop | nop |

In this example, each line comprises 4 opcodes which are executed in parallel, e.g. by a VLIW-like row of ALUs (e.g. see PCT/EP 2009/007415).

The lines are executed in a pipelined manner on multiple rows/stages of ALUs (e.g. see PCT/EP 2009/007415), or sequential as VLIW-processors would do. cycle defines the end of the Catena. Typically, defined by surrounding code, e.g. in an outer control structure, the Catena is iteratively repeated a number of times. In a preferred embodiment, dedicated hardware may be used to process the outer control structures (e.g. see PCT/EP 2009/007415).

According to the nature of a Multi-Cycle-Kernel, a Catena is typically a partition of a larger loop. As such it is usually a small loop, comprising multiple instructions, which may be executed sequentially and/or in parallel. The small loop may iterate for a fixed or variable number of iterations. Typically the number of iterations has a maximum limit (see PCT/EP 2009/007415). While practically Threads executed on one or a system comprising a plurality of processors may be executed concurrently, a group of Catenae are typically started sequentially one after another as they represent a sequence of partitions of an algorithm (e.g. such as a larger loop). Due to the clear sequence, the effort and complexity of scheduling Catenae is significantly reduced compared to Threads, such enabling smaller and more efficient schedulers—not only in terms of performance but also in respect of power dissipation.

Catenae preferably provide limited typically local branching capabilities, such as e.g. local branching into a small branch, local control flow and/or conditional opcode execution. Catenae typically do not support branching to other code (e.g. far jumps) within the loops, as e.g. jumps to other code within the thread, subroutine calls, library calls, and/or calls into Operating System functions.

While Threads are typically defined and handled by the programmer, Catenae are preferably automatically generated by the compiler.

The basic methodologies are based on analysis of the control- and data-flow of the source code, e.g. by evaluating the Data-Flow-Graph (DFG) and/or Control-Flow-Graph (CFG), which are generated by Compilers as an intermediate data structure. Preferably loops are detected, optimized, if possible split, and partitioned (for details of loop optimization see PCT/EP 2009/007415).

The optimization may comprise special focus on the detection and handling of IF constructs. IF constructs may be classified into e.g. a) constructs which can be handled locally (e.g. by local branching into a comparably small or even very small branch, local control flow and/or conditional opcode execution; and b) constructs which require rather far or more complex branching, e.g. into other Microthreads or even Threads.

Constructs according to a) are processed within a single Catena or at a plurality of Catenae within a Microthread by status forwarding from one Catena to the next e.g. via the data and/or status registers.

Constructs according to b) define the partitions of and/or branching points between Microthreads and/or Threads.

Consequently the partitioning of Catenae is resource driven by the amount of available ALUs and/or registers of the register file in the ZZYX core; while the partitioning of Microthreads is typically defined by branch points in the control flow (unless the branches are small and limited enough to satisfy the conditions of a)).

Preferably Catenae are compiled as large as possible making optimum use of the available resources.

Preferably branching and branch points in Microthreads are optimized such, that the respective Microthread becomes as large as possible.

Threads and/Microthreads may be handled by a scheduler within the Operating System (OS) and/or by a hardware scheduler. For fine grained code portions (i.e. only small blocks or parts of the code), software scheduling becomes significantly inefficient. As Catenae define typically only one single command (or potentially a very limited small number of commands) of a ZZYX core, preferably hardware schedulers are used instead.

Theoretically Catenae may be
a) handled e.g. by a software scheduler and/or a hardware scheduler which may be
 explicit code within the software (thread), generated by the compiler (or even described by the programmer),
 implemented in the compiler library (e.g. C-Library) and called by the software (thread),
 implemented in the Operating System (OS) and called by the software (thread); or
b) Catenae are defined and managed by the processor itself, e.g. by analysing code, detecting loops, generating the respective microcode and scheduling it.

Preferably Catenae are handled by a hardware scheduler controlled by explicit code within the software (thread), generated by the compiler or by code implemented in the compiler library (e.g. C-Library) being called by the software (thread).

FIG. 9 exemplary shows three basic models for handling Catenae:

In FIG. 9a both, the Task and Thread Scheduler are implemented in the operating system, which controls the CCU.

In FIG. 9b only the Task Scheduler is provided by the operating system, while thread scheduling is done by the application. Respectively the application is in control of the Catenae, too.

In FIG. 9c the Catenae are created and managed by the processor itself, while the Task and Tread Scheduler may be operated at System or Application level. Details of how the processor creates and manages Catenae are provided at a later section in this patent.

A sequence of Catenae may be defined by a Catenae Descriptor Table (CDT).

A CDT may comprise multiple entries, each having a pointer to the Catena to be executed. The order in the list may define the sequence of execution.

Additionally or alternatively a CDT may a pointer to a first Catena to be executed and a number indicating the amount of Catenae in the sequence. After the first Catena terminated, the next subsequent Catena in the memory will be executed, and so on, until the complete sequence of Catenae has been processed.

It is obvious to one skilled in the art, that other means can be implemented to indicate the sequence of Catenae. E.g. could the last Catenae not only be defined by the number of Catenae to be executed, but to a pointer pointing to the last Catena in the sequence.

Catena Descriptor Table (CDT)

While typical Threads preferrably may executed in parallel, a sequence of Catenae is usually embedded in a Thread or Microthread and executed sequentially. On a processor system a plurality of Catena sequences may be executed in parallel, according to the nature of the Threads or Microthreads comprising the Catenae.

Due to the typically linear nature of a sequence, the Program Pointer of the processor unit executing a Catena is just incrementally moving from one Catena to the next. Alternatively jump opcodes may be used to move from one terminated Catena to the next.

FIG. 1a shows a sequence of 5 Catenae (0101). In this example each Catena comprises a loop and is executed a number of cycles (LI=Loop Iteration). While in this example each Catena is executed LI-times, at least some Catena within a sequence of Catenae may be executed a different number of times than others, depending on the algorithm. LI has an upper limit, which is typically defined by the depth of the FIFOs in the register file (see PCT/EP 2009/007415).

Each Catena comprises a link pointing to the next Catena in the sequence of Catenae. Such a link may be established by any kind of Program Pointer modification (PPM, such as e.g. a jump operation or simply incrementing the Program Pointer (PP++)).

The compiler, linker and/or operating system may analyze and extract this Program Pointer modifier at the end of a Catena. A Catena Descriptor Table (CDT), as shown in FIG. 1b is construed based on the Program Pointer Modifier (PPM) information, which is consequently removed from the Catenae.

The removed PPM may be replaced by a pointer to the next Catena in the sequence. The pointer may be returned to a scheduler, scheduling the execution of the Catenae (e.g. the subsequently described CCU or CCU Control), for instructing the scheduler, which next Catena shall be executed. However, on the most typical cases and implementations, this pointer is unnecessary, as the sequence of Catenae is entirely defined by the CDT. CCU and/or CCU Control is/are informed of the termination of a Catena, e.g. via a hardware and/or software signal, and consequently the loading, mapping and execution of a subsequent Catena is triggered, in accordance with the terminated Catena and the currently already mapped and executed Catenae of the CDT.

While preferably the CDT is automatically built by the Compiler and/or Linker, in some embodiments the Operating System may generate the CDT e.g. completely from the scratch based on the PPM information, or based on CDTs pre-construed by the Compiler and/or Linker.

In a preferred embodiment a CDT is a linear list of pointers to Catenae. The execution sequence of the Catenae is represented by the order of the pointers within the list.

In an optimized version of this embodiment the execution sequence may be represented by the order of the Catenae in the compiled binary of the program, e.g. stored in the code memory. The Catenae will be executed in exactly the same sequence as they are ordered in the binary. In this version a CDT may comprise only a pointer to the first Catena to be executed and the number of Catena's to be executed. One Catena after the other will be loaded and executed, until the total number of Catena to be processed has been reached.

A Catena may comprise a header and/or footer. They may be used to indicate a Catena within the binary code. Also they may be used to define specific settings, e.g. for the address range and/or the Memory Management Units (e.g. the TLBs), and/or for the addressing (e.g. Base Pointer, Stack Pointer, and so forth.) of the Load/Store-Unit(s).

Resource Management

Preferably a Resource Allocation and Management Instance (RAMI) manages at runtime the hardware resources and their allocation to the Catena. Such an instance may be implemented in the Operating System and/or in the Processor hardware. Additionally or alternatively the Complier and/or Linker may add/link an according routine into the binary code and/or it may be embedded in the Compiler Library (e.g. C-Library).

A Resource Requirement Descriptor (RRD) being evaluated by the Resource Management Instance (RAMI) defines the resource requirements for a Thread, Microthread and/or Sequence of Catenae. While various resource requirements may be defined in a RRD (such as e.g. memory space, register set, IO-, disk-space, and/or even bandwidth requirements for data transfers to e.g. caches, main memory, disc storage and/or network) at least the amount of processing resources (e.g. ALU-Blocks according to PCT/EP 2009/007415, Vorbach) are defined.

Preferably the definition of RDD for the processing resources (e.g. ALU-Blocks) comprises a maximum value, which defines the number of processing resources (e.g. ALU-Blocks) required for processing all respective Threads, Microthreads and/or Sequence(s) of Catenae concurrently in parallel.

Additionally a minimum value may define the minimal amount of resources (e.g. ALU-Blocks) required to process the Thread, Microthread and/or Sequence of Catenae (this value is typically 1, but may be higher for complicated algorithms).

Also, additionally there may be an optimum value, defining the optimal amount of resources (e.g. ALU-Blocks) required to process the Thread, Microthread and/or Sequence of Catenae. This value might be calculated at runtime, taking the real performance requirements of the Thread, Microthread and/or Sequence of Catenae into account and further runtime values, such as e.g. performance requirements of other concurrently running tasks, battery lifetime and/or power dissipation and/or memory- and/or IO-Bandwidth.

The RAMI may read and (at least for setting the optimum value) write the RDD; and store it on a mass storage device for reloading when executing the program in future again.

As shown in FIG. 2, the Resource Requirement Definition (RDD) is preferably included in a Thread and/or Microthread (0203) comprising a Sequence of Catenae (5-times 0101). Alternatively the RDD may be included in the main task (0201) starting the depending Threads (e.g. 0202), Microthreads (e.g. 0202) and/or Sequence(s) of Catenae (e.g. 0202 and/or 0203).

Catena Management and Control

Theoretically various instances in a system may provide any of the previously discussed functions.

However, in the preferred embodiment the resource management (RAMI) is done by the Operating System (OS) and the Resource Requirement Descriptor is included in the respective Tread or Microthread. The RAMI in the OS evaluates the RDD of each currently executed Threads and allocates the hardware/processor resources (e.g. the ALU-Blocks) accordingly. Preferably a hardware instance controls (CCU=Catena Control Unit) the fetching, loading, linking and/or starting of the Catenae. In order to provide short response times the CCU and the Catena Description Tables (CDTs) are preferably under control of the Thread and/or Microthread. The according control code may be embedded in the Compiler Library (e.g. C-Library) or for even shorter response time with less latency compiled or linked into the Thread binary code by the Compiler and/or Linker.

Theoretically the control code could reside inside the Operating System (OS) however response time and latency may be too long to be efficient.

Figure 3:
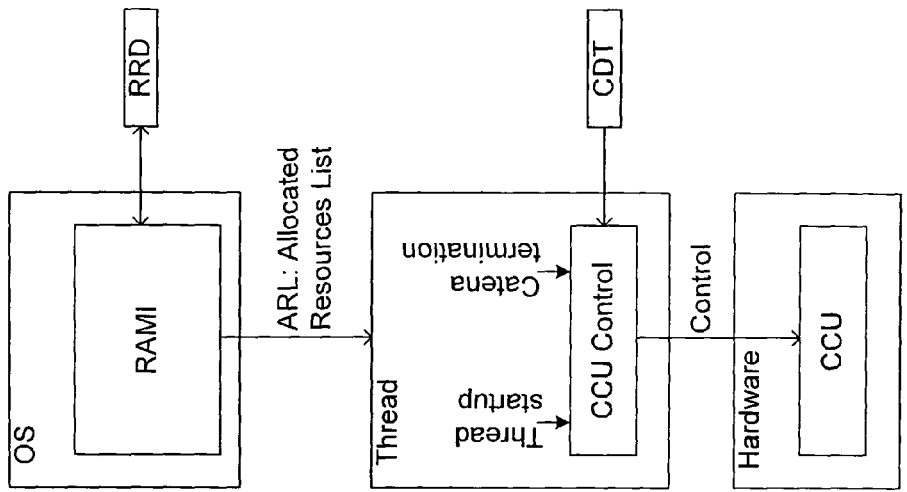

FIG. 3 shows a preferred embodiment of the handling mechanisms of Catenae on a system. The Resource Allocation and Management Instance (RAMI) inside the Operating System (OS) reads the Resource Requirement Descriptor of a Thread or Task. It allocates respectively hardware resources of the Processor and/or System. A list of allocated resources is provided to the respective Thread(s) and/or Microthreads. At Thread and/or Microthread startup, the Catena Control Unit control instance is called, which initiates the loading and mapping of the Catenae in the Catena Descriptor Table by the Catenae Control Unit (CCU) onto the physical hardware in accordance to the list of allocated resources provided by the RAMI.

Whenever a Catena terminates, it may signal the termination to the CCU Control and/or return the pointer to the next subsequent Catena to CCU Control. CCU control checks, whether the subsequent Catena is already mapped onto the physical hardware and executed, or whether it has to be loaded, mapped and/or executed yet, in which case the respective operations are triggered, which are always performed to meet the restrictions of the list of allocated resources provided by the RAMI.

CCU Control and CCU configure the bus systems inside the physical processor hardware in accordance to the linking between the Catenae, to meet the data transfer requirements between the Catenae. If multiple Catenae are linked together to a chain, the processing results are forwarded over the respectively configured bus system from one Catena to the subsequent one. The last Catena in a sequence writes its results back over the respectively configured bus system into the register file of the first Catena in the sequence. In case only one Catena of a sequence is mapped, it writes back its results into its own register file.

When mapping one subsequent Catena or a chain of subsequent Catenae the first Catena of the chain is positioned at exactly the same position of the first Catena of the previous chain, which has consequently access to the processing results of the previously processed chain of Catenae.

In a preferred embodiment the CCU is a programmable sequencer implemented dedicatedly in hardware, executing the CCU Control code. However, theoretically the CCU may be implemented entirely in software and is processed on the standard processor hardware resources (such as e.g. an ALU-Block).

Depending on the complexity and price/performance ratio of the processor hardware, a mixed implementation may be sufficient, with some parts of the CCU and CCU Control running on the standard processor resources, while other parts are implemented in dedicated hardware.

Exemplary Implementation on ZZYX Processors

While a group or even all cores (e.g. ALU-Blocks) of a multicore processor (e.g. ZZYX processor, see PCT/EP 2009/007415) may be controlled by one Instruction Issue and Fetch unit (see FIG. 17 of PCT/EP 2009/007415), preferably each core (e.g. ALU-Block) comprises its dedicated Instruction Fetch and Issue unit (e.g. FIG. 4 of PCT/EP 2009/007415). The rotor of FIG. 17b of PCT/EP 2009/007415 may be implemented using a CCU unit according to this invention. (Note: "HYPERION0", "HYPERION1" and "HYPERIONn" in FIG. 17b of PCT/EP 2009/007415 should read "ZZYX0", "ZZYX1", "ZZYXn").

In order to manage and boot a plurality of cores (e.g. ALU-Blocks) a Bootstrap Descriptor Table (BDT) may be located at a fixed position in the memory space. Each core points to a different entry in the BDT after Reset. Each of the entries in the BDT points to the code to be executed by the respective core. In the simplest implementation a BDT is a dispatcher to the code to be executed after Reset.

In one embodiment the CCU can be implemented in the Program Loader of the Operating System (OS). The Loader gets the resources allocated to the code to be loaded from the Allocated Resources List (ARL). Sequences of Catenae are detected via one or a plurality of Catena Descriptor Tables. In accordance to the ARL the Loader distributes the Catenae into the main memory into memory sections dedicated to specific cores. By doing so, the source code is cut and rearranged. While previously the Catenae were arranged in linear order (e.g. Catena0, Catena1, Catena2, Catena3, . . . , n) the order is cut and each core gets the Catenae to be executed newly arranged and allocated. Assuming a total of 16 Catenae should be executed and 4 cores have been allocated according to the ARL by the RAMI, the newly arranged code may look like this:
Core 1: Catena0, Catena4, Catena8, Catena 12
Core 2: Catena1, Catena5, Catena9, Catena 13
Core 3: Catena2, Catena6, Catena10, Catena 14
Core 4: Catena3, Catena7, Catena11, Catena 15

The linear execution order of the sequence of Catenae is broken and rearranged. Instead of executing Catena1 after Catena 0, Core 1 will execute Catena4 after Catena0, then Catena8 and then Catena12.

However, as the Cores 1, 2, 3, and 4 are chained by the data bus system, the Catenae are correctly executed, as the Cores process concurrently in parallel and e.g. Catena0, 1, 2, and 3 are processed concurrently.

Figure 4B:
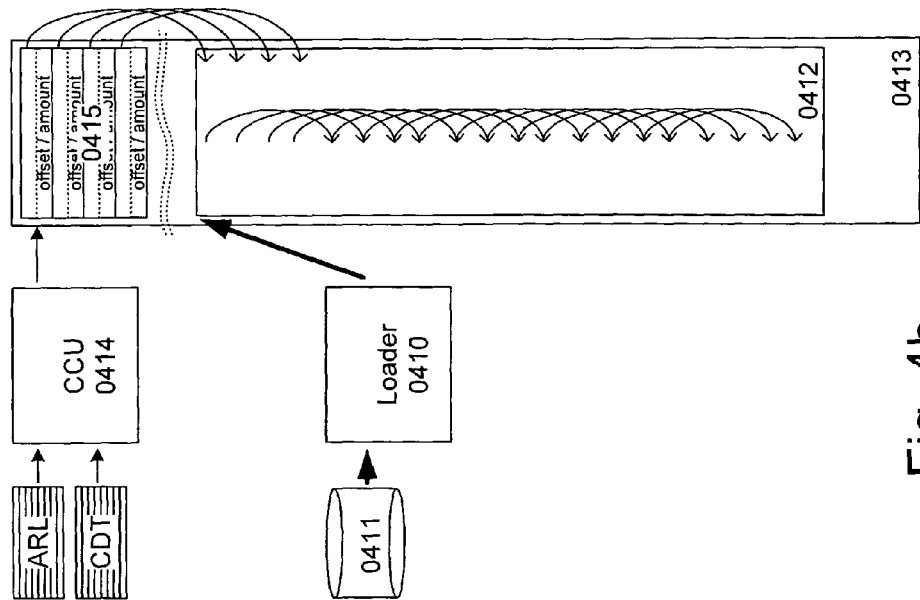
Figure 4A:
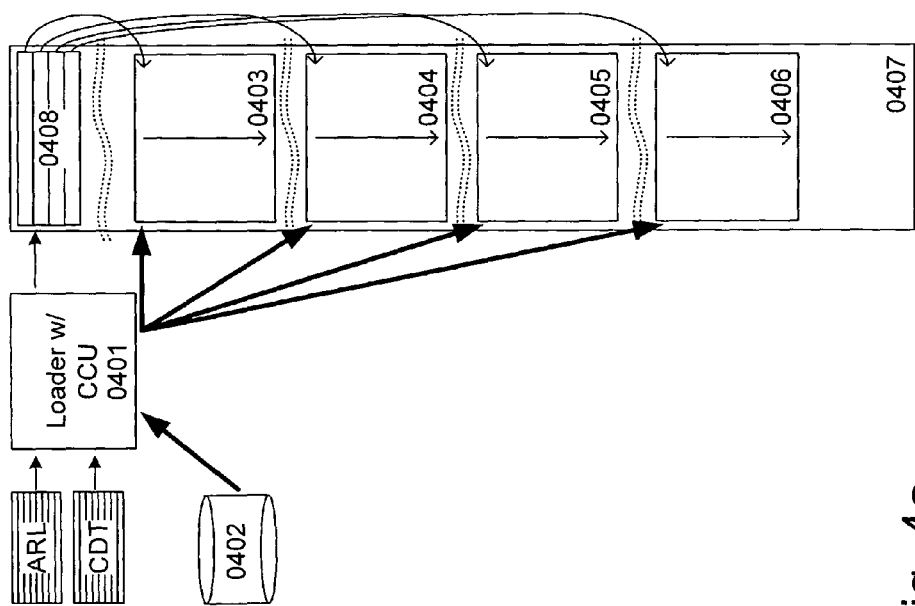

FIG. 4a shows the respective implementation. The Loader with the integrated CCU (0401) gets the list of allocated resources (ARL). The code is loaded from a mass memory (0402). Based on the respective CDT of the code, the loader distributes the Catena to the memory sections of (according to this example) 4 cores (e.g. ALU-Blocks) (0403, 0404, 0405, 0406) in the main memory (0407). The loader sets the BDT (0408) for the cores in accordance to the specific memory sections for each core and starts the cores.

Each core will sequentially walk through its memory section and execute the distributed Catenae therein linearly one after another.

One issue of this embodiment is the major effort in the Loader (0401), as it has to rearrange the Catenae, thus requiring significant performance and making the binary code loading process slow.

Another, preferred embodiment requires no additional effort of the Loader. The binary code is loaded unmodified into a section of the memory.

A separated CCU, implemented in hardware and/or software gets the resources allocated to the code to be loaded from the Allocated Resources List (ARL). Sequences of Catenae are detected via one or a plurality of Catena Descriptor Tables. Instead of rearranging the Sequence of Catenae, the sequence remains unmodified in its original order. The CCU adds and offset and an amount to the BDT. The offset defines for each core (e.g. ALU-Block), which offset is added to the program pointer when moving ahead to loading the subsequent Catena. Amount defines the amount of Catenae to be loaded and processed by the specific core.

Each core jumps through the Sequence of Catenae according to the offset, in the offset field of the BDT, defined in the BDT, which has the very same effect as rearranging the Catenae according to FIG. 4a. After a core has processed its respective amount of Catenae, as defined in the amount field of the BDT, it stops further operation and idles until interrupted or reset; preferably it enters a kind of sleep mode, which will reduce power consumption, e.g. by gating the clock and/or reducing or even switching-off the supply voltage.

FIG. 4b shows an implementation of the preferred embodiment:

A Loader (0410), e.g. embedded in the Operating System, loads the binary (0412) from a mass storage (0411) into the main memory (0413).

Either the CCU reads the CDT directly from the main memory after loading or the Loader directly provides the CDT to the CCU (0414). The CCU (0414) gets the list of allocated resources (ARL) from the RAMI, which may be part of the Operating System. The CCU sets the pointer to the start address of the first Catenae to be processed for each of the cores in the BDT. Additionally the CCU calculates the jump offset between the Catenae according to the amount of cores provided in the ARL and sets an offset field and amount of Catenae to be executed field accordingly in the BDT (0415).

Each Core (e.g. ALU-Block), loads and executes the first Catenae to be processed as defined in the BDT. After a Catena terminates the Program Pointer of the respective core does not move to the next Catena in the code sequence, but increases by the value of the offset field of the BDT and then loads and executes the specific Catena; which is indicated by the arrows within the 0412 box. After exactly the amount of Catenae defined by the value of the amount field in the BDT has been processed, the respective Core stops operating and enters an idle or sleep mode. Driven by a hardware signal (such as Reset or an Interrupt) and/or software signal (such as a software interrupt) the Cores may become operational again and e.g. restart operation by evaluating the according field in the original or newly written BDT again.

For managing, rearranging and/or distributing, etc. Catenae, it is beneficial to know the size of each of the Catenae. Various approaches are feasible, e.g. providing a size and/or length field in the Catenae and/or having a Catenae end token, indicating the end of a Catena. ZZYX processors preferably implement an end token. In PCT/EP 2009/007415 an EOC indicator exists, indicating the End-Of-Code for an ALU-Block (e.g. a core). Therewith it is indicating the end of a Multi-Cycle-Kernel, or in the terminology of this patent the End Of a Catena (EOC).

"offset" in the BDT field (0415) may be relative to the size of the Catenae. The program pointer may not be modified absolutely, like PPnew=PP+offset, but relative to the sizes of the Catenae crossed: $PPnew = PP + \Sigma_{i=0}^{offset} SizeOfCatena_i$ To compute this sum at runtime, the evaluation of the size of each Catena crossed may be too much effort and therefore slow. Depending on the application and the device, the processor being integrated in, two methods are feasible to reduce the effort:

Systems being memory limited may use a lookup table, which is being created by the compiler and/or linker at compile- and/or link-time. The table comprises the size for each of the Cateae. At runtime, the CCU parses the table and calculates the offsets for the BDT fields in accordance to the size information in the table.

Alternatively each Catena may have a header comprising the size information. At runtime, the CCU walks through the Catenae by starting at the first one adding the size information in the header to the Program Pointer for getting the next one, again adding the size information in the header to the program pointer, and so on. Finally the program pointer ends up at the required Catena or the offsets for the BDT fields can be calculated in accordance to the collected size information in the headers.

Systems with less memory limitations may expand all Catenae to a standard maximum size. If a Catena is smaller than this standard size, it is expanded with neutral NOP (No OPeration) opcodes at the end of the Catena. The expansion may be done in software, e.g. by the Loader, and/or in hardware, e.g. by a block move unit (such as e.g. a Direct Memory Access controller (DMA)) when moving the binary from a mass memory into the code memory section.

The Catenae are detected and parsed in order to evaluate their size. Catenae being smaller than the defined standard size are expanded by inserting NOP opcodes. Ideally the Catenae are cut out from the binary and moved into a separated memory section of the code memory. This eliminates the requirement for adopting all jump addresses of the respective code, as the location of the entry addresses will change due to the larger binary. By moving the Catenae to a separate memory space, only the addresses in the BDTs have to be modified accordingly.

In a more complex implementation, the Catenae may be left in the binary code first, as long as their memory space does not overflow. As soon as the expanded Catenae consumed all the memory space of the original sequence of Catenae, the remaining Catenae are moved to a separated memory section. This extension provides optimum memory density when expanding the Catenae, as it avoids an empty memory section where the original Catenae where located.

ZZYX processors as an example of multicore processors e.g. may expand all Catenae to a 4*4 ALU-Block arrangement comprising 16 instructions, one for each ALU in the ALU-Block. While loading the binary code, the end of a Catena is detected by checking the EOC indicator. If the respective Catena is too small, EOC will be removed from the last code line and further lines with NOP opcodes will be added. The last line will comprise the EOC to indicate the new end of the Catena.

As Catenae typically make best use of the hardware and use as many hardware resource (e.g. ALUs) as any possible, which means most Catenae will have maximum size or at least are close to it, the expansion of the Catenae will not increase the code drastically. Therefore the expansion of the Catenae will not decrease the code density significantly.

This consideration leads to a third and preferred embodiment: The compiler and/or linker creates at compile- and/or link, time all Catenae with exactly the same size and already fills in NOPs and/or empty code and/or arranges the Catenae at a fixed address raster with a fixed offset in between the start addresses of each of the Catenae. This slightly increases the binary code, but avoids any later code expansion of address computation at runtime.

In some cases may be necessary to synchronize the loading and execution of new Catenae. Preferably this is done at hardware level, by providing handshake signals to control the data transfers between the cores (e.g. ALU-Blocks) and/or use handshaking and/or synchronization signals for controlling the loading of code and/or data processing.

Description of the Remaining Figures

After providing the details of the inventive threading and scheduling methods, FIG. 1 is discussed in greater detail.

FIG. 1*a* shows a sequence of 5 Catenae (5-times 0101), chained by a Program Pointer Modifier PPM. Each Catena may comprise a loop and may be iteratively executed LI-times. Typically LI is the same value for all Catenae of the shown sequence (in FIGS. 1*a* and 1*b*), but depending on the algorithm, it may be different for each or at least some of the Catena(e) of the sequence.

FIG. 1*a*1 shows the simplest execution of a sequence of Catenae, which is strictly sequential, after one Catena is processed LI-times, the next subsequent Catena is loaded and executed. This is repeated CI-times (CI=Catenae Iteration), which CI=5 Catinae in this example) until all Catenae of the sequence have been processed.

In FIG. 1*b* a CDT has been built based on the PPM of each Catena of the sequence. If (FIG. 1*b*1) the RAMI provides all necessary resources to execute the sequence of Catenae in parallel, all may be loaded and mapped consecutively onto the processor hardware resources (e.g. ALU-Blocks). The results from one Catena are streamed to the next over the accordingly configured bus system and data is processed concurrently in a pipelined manner.

In case RAMI provides less then all resources to execute all Catenae of the sequence concurrently in parallel, linearly consecutive portions of the Sequence of Catenae in the CDT are sequentially loaded, mapped and executed on the resources. FIG. 1*b*2 shows an example, in which three hardware resources (e.g. ALU-Blocks) are provided by the RAMI.

First the first three Catenae in the CDT are loaded, mapped and executed. The results from one Catena are streamed to the next over the accordingly configured bus system and data is processed concurrently in a pipelined manner. The last Catena in the sequence writes its results back into the register file of to the first Catena of the sequence over an accordingly configured bus system. Next the second two Catenae in the CDT are loaded, mapped and executed. Again, the results from one Catena are streamed to the next over the accordingly configured bus system and data is processed concurrently in a pipelined manner. The last Catena in the sequence provides the final results, which may be written back to the first Catena of the mapped part of the sequence. One block of hardware resource (e.g. ALU-Blocks) is being unused in this step. It might be disabled, gated from the clock supply and/or powered down for power saving measures, or being used for other Catena, Microthreads and/or threads during the current period.

Execution Modes

The ZZYX processor (used exemplary for all kind of multi-ALU/Multi-Execution-Unit processors) comprises multiple ALUs in an array with pipeline stages between each row of ALUs (ALU Stage), for details reference is made to PCT/EP 2009/007415.

In one embodiment at least some combinations of the following operation modes are supported:

1. Joint Mode: All ALU stages within an ALU-Block operate jointly on the same thread and set of data. Typically the instruction issue to the various ALU stages occurs sequentially in time. One single Program Pointer points to a block of instructions. The block of instructions (Catena) supplies instructions for each of the ALU stages in use. The program pointer moves in steps of the size of the respective Catena.
2. Independent Mode: At least some of the ALU stages within an ALU Block operate on a different thread, microthread or Catena, using a distinct set of data. Each ALU stage is getting one instruction independently of other ALU stages per cycle. Each ALU stage maintains a specific dedicated Program Pointer (PPALU-Stage). Each Program Pointer moves in steps of one single instruction.
3. ULIW Mode: At least some of the ALU stages within an ALU Block operate on the same instruction, which is a combination of all instructions for each of the ALU stages (Ultra Large Instruction Word). Each ALU may process a different instruction. The instruction issue to all ALU stages occurs simultaneous. One single Program Pointer points to an Ultra Large Instruction Word (ULIW). The ULIW supplies distinct instructions for each of the ALU stages in use. The program pointer moves in steps of the size of the respective ULIW.

Joint Mode

The joint mode is described in detail in PCT/EP 2009/007415. The mode is subdivided in at least four subsets: Matrix, Superscalar, Vector and Hyperscalar. Matrix, Vector and Hyperscalar modes use typically a plurality of ALU stages. In superscalar mode, only the first stage, according to PCT/EP 2009/007415 is used, which operates as VLIW processing unit.

ULIW Mode

The ULIW Mode is an extension of the VLIW Mode and therefore an additional subset of the Joint Mode. A plurality of ALU Stages is directly connected to the register file. Inter-ALU data transfer from one ALU to another is disabled. All the ALUs are connected to the register file in the typical VLIW alignment. Each ALUs are supplied with one instruction per clock cycle. This requires a wider instruction issue unit and instruction cache to support concurrent issue of instructions to more than one ALU stage.

FIG. 5 shows the basic configuration of the exemplary ZZYX architecture in Joint Mode. The 4 ALU Stages (0501*a, b,c,d*) in the ALU-Block (0502) are connected to a Register File (0503). The Register File comprises FIFO Data Registers (FDR) (0504). The FDR may support at least some of the following modes according to PCT/EP 2009/007415:

Single Registers Mode (SRM), in which the specific register operates as a single entry register as typical microprocessor registers do.

FIFO Register Mode (FRM), in which the specific register operates as multi entry First-In-First-Out (FIFO) register.

Preferably FIFO flags (such as full, empty, almost-full and almost-empty) are generated, which can be checked via opcodes similar to status signals and can be used for conditional 20 execution or branching. This feature is important for loop control, in particular in Matrix- and/or Hyperscalar mode.

Additionally underruns (read if FIFO is empty) or overruns (write if FIFO is full) may generate error states, for example via interrupts or traps.

Limited Length FIFO Register Mode of the length n (LL-FRM(n)), in which the specific register operates exactly like in the FIFO mode, but the depth of the FIFO is limited to n stages. The value of n is specifically definable by the respective instruction. This feature is extremely powerful for processing small local loop carried dependences, as described later on. While in FIFO mode typically underrun and/or overrun are regarded as runtime error, in Limited Length FIFO Register Mode they are regarded as normal and typically generate no error condition (e.g. a trap, interrupt or status signal). However according status signals may be produced and/or even interrupts or traps, if required by the program. Registers in Limited Length FIFO Register Mode operate typically like bucket-brigade registers, values are shifted from one register to the next. With every new entry stored in a LLFRM[n] a value may be shifted out, in the preferred embodiment regardless whether it is accepted by a receiver or not.

Figure 6:
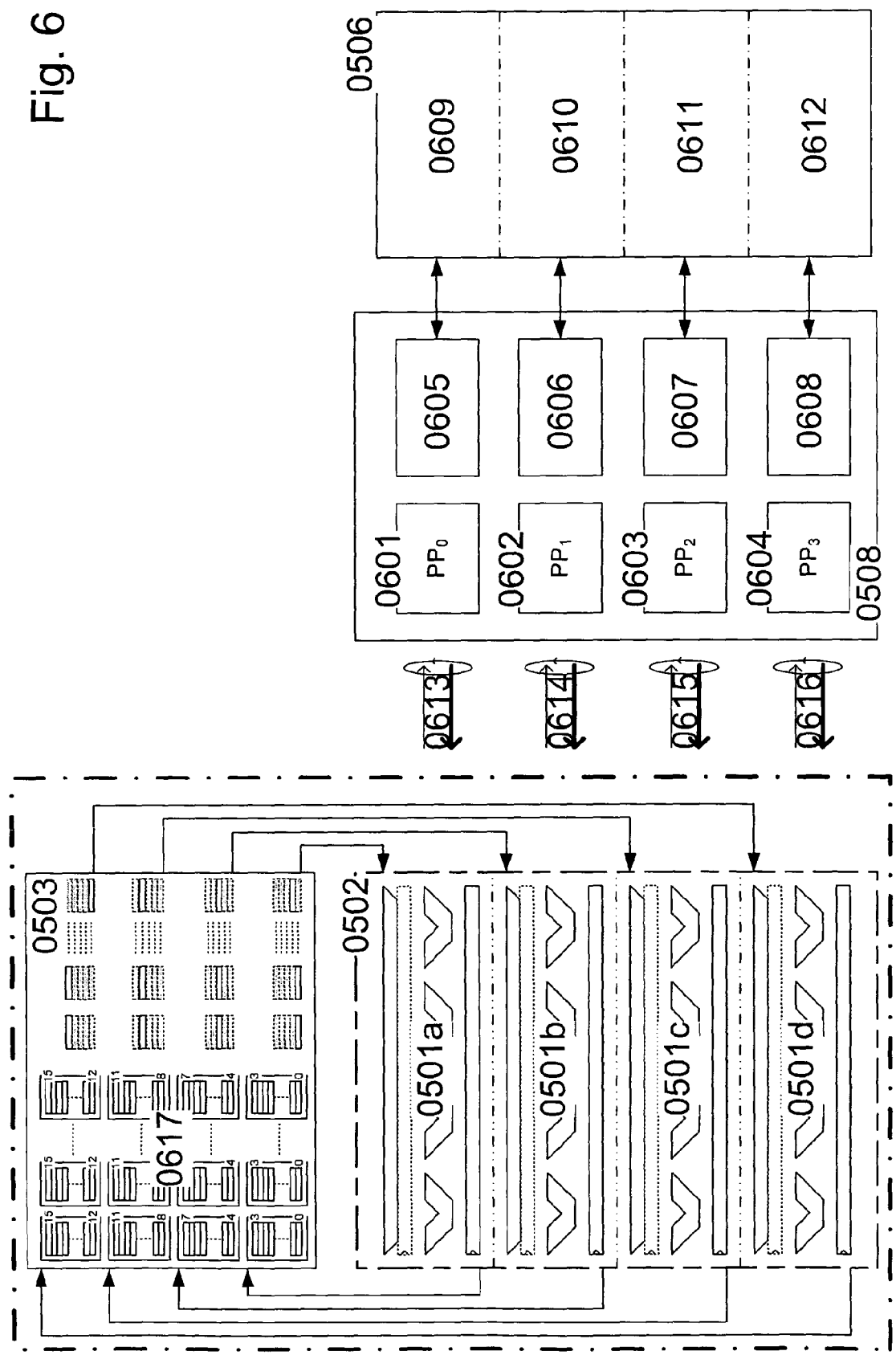

In the exemplary embodiment of FIG. 5 and FIG. 6, the 16 FDR are implemented, each being 16 FIFO entries deep.

Additionally the Register File in this exemplary embodiment comprises 64 of the VLIW Data Registers e00 . . . 63 (VDR) (0505), each of them 32-bit wide. Note that compared to PCT/EP 2009/007415 the number of VDR has been significantly increased to provide sufficient register space for the additionally operating ALUs in ULIW processing mode.

VLIW processors implement data pipelining in a horizontal manner, which means that data streams are pipelined from one horizontally arranged ALU to the next through the Register File. For instance a data word may be transferred in a first clock cycle by processing from a first register R1 through a first ALU A1 to a second register R2, in a second clock cycle it is transferred from R2 through a second ALU A2 into a third register R3, and so on. Thus, a large set of registers accessible in parallel is required for pipelining the data through the ALUs. The set of FIFO registers (FDR) may be too small to satisfy the register requirements in VLIW/superscalar mode. However extending the number of FIFO registers (FDR) is expensive, due to the depth of the FIFOs. Therefore the 64 single register (VDR), not comprising FIFOs and with no selectable mode, are added to the Register File.

In ULIW mode, instruction fetch and instruction issue of all instructions for each of the ALU stages happens simultaneously. Preferably the instruction memory, typically a Level-1 Instruction Cache (I-Cache) (0506) has a very wide instruction output (0507), capable of providing all instructions necessary for the ALU Blocks simultaneously to the instruction decoder (0508). The instruction decoder comprises preferably a plurality of instruction decode subunits (0509$a,b,c,d$), capable of concurrently decoding and issuing (0510) the ULIW instructions for at least a plurality of the ALU Stages in the ALU Block.

One global control unit (0511) controls the program flow and maintains the Program Pointer. For supporting conditional code execution and conditional jump operation, status information from the plurality of ALUs in the ALU-Block is transferred (0512) to the control unit.

The instruction cache (0506) is preferably multi-way (n-way) associative. In this exemplary embodiment a 4-way associative implementation is regarded preferable.

Independent Mode

In a preferred embodiment (shown in FIG. 6) of the independent mode, each ALU Stage of a total of m-stages operates as an independent VLIW controller. In this exemplary embodiment m=4. Each ALU Stage ALU-Stage$_i$, ($0 \le i < m$) (0501$a$=ALU-Stage$_0$, 0501$b$=ALU-Stage$_1$, 0501$c$=ALU-Stage$_2$, 0501$d$=ALU-Stage$_3$) has a local control unit (0601, 0602, 0603, and 0604) handling conditional execution and conditional jumps and maintaining a dedicated Program Pointer PPi, ($0 \le i < m$). Each of the ALU Stages has a dedicated instruction fetch and issue unit (0605, 0606, 0607, and 0608) operating independently from others. The n-way associative cache (0506) is configurably split into m independent banks (0609, 0610, 0611, and 0612). Therefore n must be greater or equal m.

If n=m, there are n=m directly mapped independent cache banks.

If n≤$2^P$*m, p-way associative cache sets may be supported in each of the m-banks.

If n<$2^P$*m, only (p–1)-way associative cache sets may be supported in each of the m-banks, while some of the banks may be unused or are dedicated to a specific core.

Each ALU-Stage provides (see interconnection 0613, 0614, 0615, and 0616) status information independently to its dedicated local control unit and receives (see interconnection 0613, 0614, 0615, and 0616) independently issued instructions from its dedicated instruction decoder on a cycle by cycle basis.

The m independent cache banks supply instructions to the m instructions decoders in parallel.

Independent Mode Register File

Each ALU-Stage operates independently as small VLIW controller.

Preferably, each of the FDR is split into m-banks having 1/m of the total size. In the exemplary embodiment, each of the FDR registers (0504) is configurably split in independent mode into 4 banks each being 4 FIFO entries deep (0617).

Further each ALU-Stage has a set of Dedicated Data Registers (DDR) providing sufficient register space for VLIW processing. An amount of about 4-times the number of ALUs in the stage is regarded sufficient. As the exemplary embodiment has 4 ALUs per ALU-Stage i, 16 Dedicated Data Registers (DDR) $r_i 0 \ldots 15$ are implemented per ALU-Stage.

It is preferred that at least some of the registers $r_i$ of the Dedicated Data Registers (DDR) are mapped into the VLIW Data Registers (VDR), for passing data between the VLIW, ULIW, or Hyperscaler modes and Independent mode.

In the exemplary embodiment this can be achieved by just splitting the 64 VDR registers into 4 sets of 16 DDR registers, one set per ALU-Bank (m=4). Basically v VDR registers are split into m sets, each having v/m registers. Each ALU-Stage can access its respective DDR register set ($r_i 0 \ldots 15$) dedicatedly, independent and in parallel. The DDR registers are mapped into the VDR register space, as shown in FIG. 7. The DDR registers $r_i 0 \ldots 15$ of ALU-stage i are mapped onto e(00+16*i) ... (15+16*i) of the VDR. Data can be passed back and forth via that mapping when switching the processing modes.

In some embodiments more VDR register may exist than being usable for mapping onto DDR registers. In that case, some of the VDR registers simply may not be mapped and consequently not being used for passing data.

In some other embodiments less VDR register may exist than being required for forming a sufficient DDR register set. A respective example is shown in FIG. 8*a* and FIG. 8*b*. In this example also 4 ALU-Stages are implemented (m=4), each of the stages having 4 ALUs. Therefore a reasonable DDR register set would again have 16 registers $r_i 0 \ldots 15$, but the VDR in this example has only 16 registers e0 ... 15 and is therefore too small for forming the DDR. In this case, each of the ALU-Stages has also a set of registers $r_i 0 \ldots 15$, which is additionally implemented and separated from the VDR. However, for supporting parameter passing between the VLIW, ULIW, or Hyperscaler modes and Independent mode each of the register stages maps a dedicated set of VDR registers into the DDR space.

In FIG. 8*a* the basic implementation is shown:

For stage 0, the VDR registers e00 to e03 are used as dedicated DDR registers $r_0 0 \ldots 3$, but $r_0 4 \ldots 15$ are additionally implemented. $r_0 0 \ldots 3$ are used for parameter passing.

For stage 1, the VDR registers e04 to e07 are used as dedicated DDR registers $r_1 4 \ldots 7$, but $r_1 0 \ldots 3$ and $r_1 8 \ldots 15$ are additionally implemented. $r_1 4 \ldots 7$ are used for parameter passing. For stage 2, the VDR registers e08 to e11 are used as dedicated DDR registers $r_2 8 \ldots 11$, but $r_2 0 \ldots 7$ and $r_2 12 \ldots 15$ are additionally implemented. $r_2 8 \ldots 11$ are used for parameter passing. And so forth. In modes other than the independent mode, the additional DDR registers are not visible.

From a programming perspective this implementation is objectionable, as the registers for passing parameters are not fixed but on different locations for each of the ALU-Stages. The compiler and/or assembler may hide this, but also a fixed implementation in hardware is possible as shown in FIG. 8*b*: As before, each ALU-Stage uses a respective dedicated set of VDR registers within its DDR register space, but the VDR registers are mapped into a fixed area within the DDR register space common for all ALU-Stages, in this example the VDR registers e(00+16*i) ... (15+16*i) are mapped onto $r_i 0 \ldots 3$ for all i ALU-Stages.

In other embodiments of the independent mode, not each ALU Stage may operate independently, but only some. In some embodiments the ALU Stages may be organized in independently operating groups.

Independent Mode Catena

All operations within an ALU-Block are combined within Catenae. Therefore code for the plurality of ALU-Stages operating in independent mode is encapsulated within one Catena. Consequently the execution in all ALU-Stages is started, when the respective Catena is entered. The respective Catena can only be left if operation in all ALU-Stages a) has terminated, b) has been interrupted, or c) has been quit from another entity e.g. via a reset or terminate signal.

Independent Mode is typically used for control functions, such as controlling a device (e.g. a mouse, keyboard, disk, ethernet, etc) or control code (e.g. entropy coder (e.g. Huffman, CABAC), Viterbi, Rake, etc). All this algorithms live either while the system is operational (e.g. device drivers) and never terminate or at least while the application is running (e.g. entropy coder, Viterbi, Rake). The processing of those algorithms will only terminate when the system is shut down, or at least the application is stopped.

Other applications in which a plurality of small sequential kernels operates in the same set of data or at least data with similar locality are highly suited for Independent Mode. Examples are search algorithms (e.g. a tree could be split and distributed on a plurality of ALU-Stages), or pattern matching. Those applications terminate, with a specific result, e.g. found/not-found, match/no-match, in which case the catena is left.

A Catena for Independent Mode comprises a header (Dispatcher) with dedicated jump information (typically addresses relative to the current Program Pointer) to the code for each of the ALU-Stages. In some embodiments the code might be encapsulated in the Catena. In other embodiments, the code will be located outside the Catena.

In any case, the Global Control Unit (0511) stops operation after the switch to Independent Mode happened.

Each ALU-Stage has a terminated-flag in its status register, which can be set by the software. Whenever the operation of an ALU-Stage is terminating, the respective flag is set.

Unused ALU-Stages have the flag set by default. An ALU-Stage can be defined as unused, e.g. by having a respective flag in the Dispatcher and/or by having the jump information set to an useless offset (e.g. 0)).

If the terminated-flags of all ALU-Stages are set, the Global Control Unit (0511) restarts and moves ahead to the next Catena in the sequence.

Figure 4C:
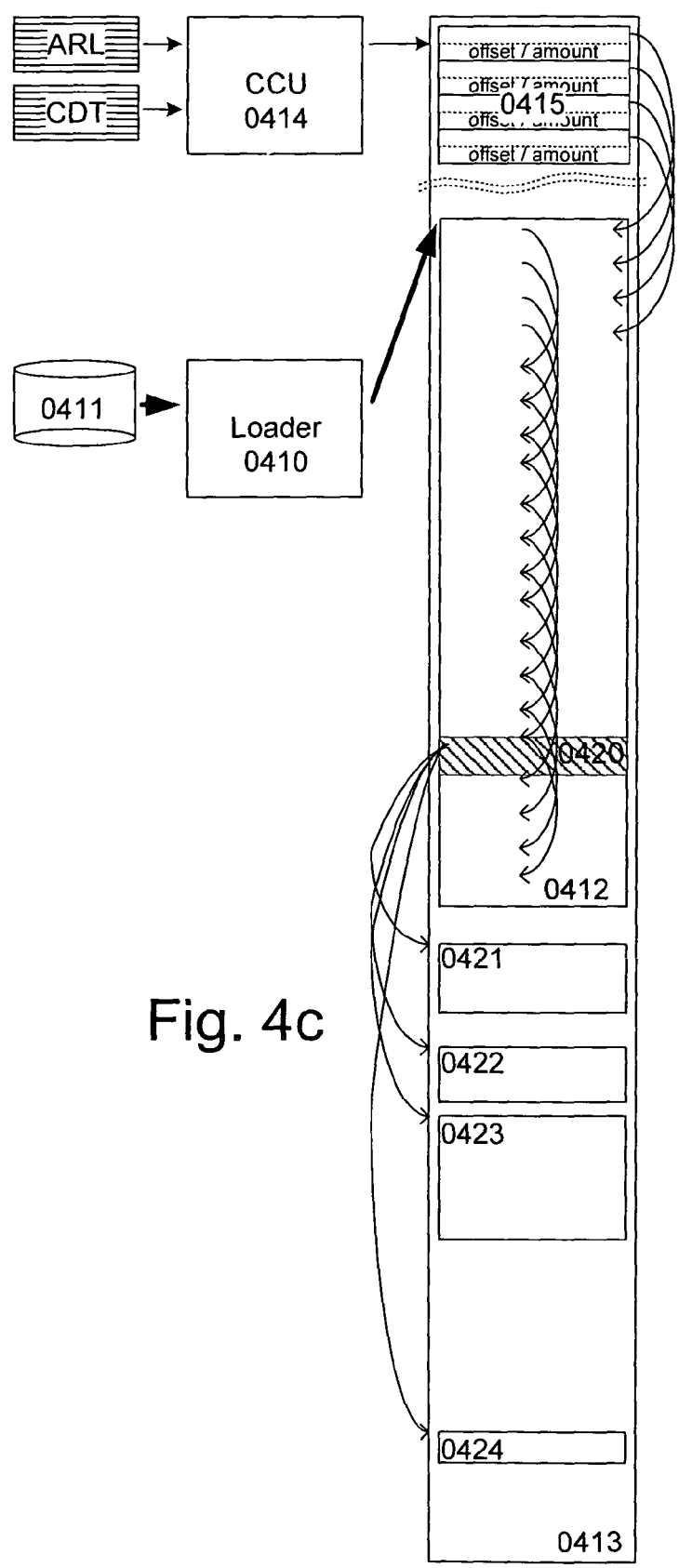

FIG. 4c shows an Independent Mode Catena (0420) having a dispatcher to 4 code blocks for 4 ALU-Stages. The dedicate program pointers of the ALU-Stages are respectively set to start the execution of code 0421 for one of the ALU-Stages, of code 0422 for another one of the ALU-Stages, of code 0423 for another one of the ALU-Stages, and of code 0424 for the last one of the ALU-Stages.

The program pointers do not jump back into the Catena, but the terminate-flags are set by the respective ALU-Stages, which cause the Global Control Unit (0511) to restart and move to the next Catena in the sequence.

Interrupt

When Catenae are processed, a Catena is the smallest code entity. No single operation within a Catena is interruptable but only the whole Catena. Some Catenae might be declared as atomic, which means the respective Catena cannot be interrupted at all, but only after it has terminated. As in all modes but Independent Mode the execution time of Catenae are limited by the number of iterations (LI), which has an upper limit, being typically defined by the depth of the FIFOs in the register file (see PCT/EP 2009/007415), it more efficient to wait for a Catena to terminate, than to interrupt a Catena and saving all necessary information to return and continue processing again.

In Independent Mode no single ALU-Stage is interrupted, but only the whole Catena.

The invention claimed is:

1. A method for executing a program on a processor the method comprising:
scheduling by a scheduler available processing hardware resources for executing at least one thread on at least one of a plurality of cores included in the processor,
each core having a multi-dimensional array of execution units and a register file, wherein the at least one thread is included in a plurality of threads partitioned from the program;
mapping the at least one thread for execution onto the hardware resources allocated by the scheduler;
configuring the interconnection between the execution units and the register file within one or more of the plurality of cores; and
creating one or more threads by the processor itself;
wherein creating one or more threads by the processor itself includes analyzing code by the processor.

2. The method of claim 1, wherein the scheduler is implemented in hardware.

3. The method of claim 1, wherein creating one or more threads by the processor itself includes detecting loops by the processor.

4. The method of claim 1, wherein creating one or more threads by the processor itself includes generating microcode for the one or more threads by the processor.

5. The method of claim 4, further comprising scheduling the one or more threads by the processor.

6. The method of claim 1, wherein the cores are Arithmetic Logic Unit (ALU) blocks.

7. The method of claim 1, wherein the one or more threads created by the processor include partitions of threads.

* * * * *